US006637462B2

(12) United States Patent
Foster, Jr. et al.

(10) Patent No.: US 6,637,462 B2
(45) Date of Patent: Oct. 28, 2003

(54) VARIABLE PRESSURE CONTROL DEVICE

(75) Inventors: Joseph E. Foster, Jr., Sterling Heights, MI (US); Neil E. Russell, Bloomfield Hills, MI (US)

(73) Assignee: Ross Operating Valve Company, Troy, MI (US)

( * ) Notice: Subject to any disclaimer, the term of this patent is extended or adjusted under 35 U.S.C. 154(b) by 143 days.

(21) Appl. No.: 09/847,655

(22) Filed: May 2, 2001

(65) Prior Publication Data

US 2002/0162587 A1 Nov. 7, 2002

(51) Int. Cl.$^{7}$ ................................................ G05D 16/20

(52) U.S. Cl. .............................. 137/627.5; 137/596.16; 137/596.2

(58) Field of Search ....................... 137/596.14, 596.15, 137/596.16, 596.2, 625.6, 625.64, 625.66, 627.5

(56) References Cited

U.S. PATENT DOCUMENTS 3,443,841 A * 5/1969 Kobnick ................ 137/596.16
3,548,879 A * 12/1970 Wilde ....................... 137/627.5
3,743,364 A * 7/1973 Holmes ...................... 137/107
3,921,666 A * 11/1975 Leiber ................... 137/596.16
5,044,398 A * 9/1991 Mock et al. ............. 137/596.2
6,116,280 A * 9/2000 Goodell ................... 137/627.5

FOREIGN PATENT DOCUMENTS

DE 3827013 A1 * 2/1990

* cited by examiner

*Primary Examiner*—Michael Powell Buiz
*Assistant Examiner*—Ramesh Krishnamurthy
(74) *Attorney, Agent, or Firm*—Harness, Dickey & Pierce, P.L.C.

(57) ABSTRACT

A control valve system having a housing defining an inlet, an outlet, and an exhaust. A first passage extends between the inlet and the outlet and a second passage extends between the outlet and the exhaust. The control valve system includes a first valve disposed within the first passage. The first valve is movable between a closed position and an opened position. Similarly, the control valve system includes a second valve disposed within the second passage. The second valve is movable between a closed position and an opened position. Furthermore, the control valve system includes a regulator circuit operably coupled to the housing, which outputs a pilot pressure in response to an inlet pressure. An actuating member is slidably disposed within the housing and moveable in response to a pressure differential between the outlet and the pilot pressure. The actuating member independently actuates the first valve and the second valve to provide a quick pressure and exhaust feature.

15 Claims, 6 Drawing Sheets

VARIABLE PRESSURE CONTROL DEVICE

FIELD OF THE INVENTION

The present invention generally relates to control valves, and more particularly, relates to a variable pressure fluid control valve that includes a quick exhaust control feature selectively actuated in response to the regulated output of a proportional regulator.

BACKGROUND OF THE INVENTION

Control valves having a pressure regulator are often used to exhaust excess fluid pressure. Traditionally, these pressure regulators act to relieve fluid pressure by exhausting the fluid through a fluid passage within the pressure regulator assembly. However, often fluid relief passages are relatively small and require an extensive amount of time to exhaust the fluid pressure. Accordingly, these known pressure regulators may not maximize the fluid exhaust rate of the control valve.

Control valves often employ pressure regulators to maintain a predetermined fluid pressure in response to a control signal. However, control valves in general are not particularly suited to operate as pressure regulators, since they are unable to rapidly adjust to a higher pressure and rapidly adjust to a lower pressure. Specifically, these control valve may be capable of rapidly increasing pressure, however they are notoriously slow at reducing pressure. Hence, they may not supply sufficient control of the fluid pressure under all operating parameters.

Accordingly, there exists a need in the relevant art to provide a control valve capable of providing variable fluid regulation while simultaneously capable of providing rapid fluid pressure exhaust. Furthermore, there exists a need in the relevant art to provide a single control valve capable of providing variable fluid regulation and rapid fluid pressure exhaust in response to a simple pilot pressure. Still further, there is a need in the relevant art to provide a control valve capable of overcoming the disadvantages of the prior art.

SUMMARY OF THE INVENTION

A control valve system having an advantageous construction is provided. The control valve system including a housing defining an inlet, an outlet, and an exhaust. A first passage extends between the inlet and the outlet and a second passage extends between the outlet and the exhaust. The control valve system includes a first valve disposed within the first passage. The first valve is movable between a closed position and an opened position. Similarly, the control valve system includes a second valve disposed within the second passage. The second valve is movable between a closed position and an opened position. Furthermore, the control valve system includes a regulator circuit operably coupled to the housing, which outputs a pilot pressure in response to an input signal. An actuating member is slidably disposed within the housing and moveable in response to a pressure differential between the outlet and the pilot pressure. The actuating member independently actuates the first valve or the second valve to provide a quick pressure or exhaust feature.

The control valve system of the present invention possesses the ability to rapidly respond to a pilot pressure and, consequently, rapidly change the output fluid pressure to a higher or lower pressure in response to a pilot pressure signal while providing fluid flow to a cylinder or device. The control valve system of the present invention can start at any fluid pressure in its range, including zero pressure, and rapidly adjust to any other pressure within its range. It is unique in its ability to change its pressure higher or lower quickly while simultaneously providing fluid flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
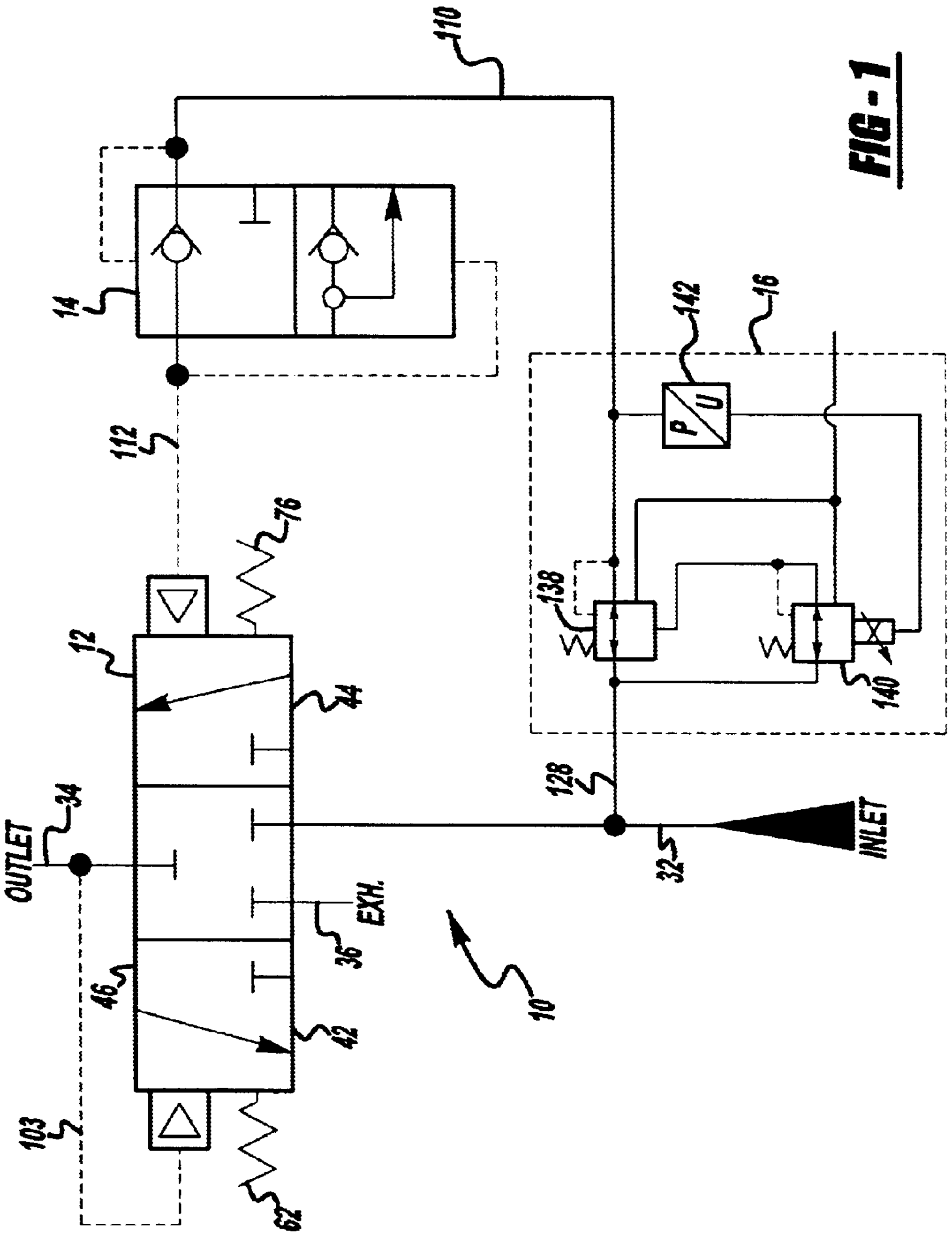
FIG. 1 is a circuit diagram of a variable pressure control device according to the principles of the present invention illustrated in a deactuated position.

The following description of the preferred embodiment is merely exemplary in nature and is in no way intended to limit the invention, its application, or uses.

Referring now to the drawings in which like reference numerals designate like or corresponding parts throughout the several views, there is shown a variable pressure control device 10, which is designated generally by the reference numeral 10. Variable pressure control device 10 is shown as a fluid circuit in FIG. 1 and as a fluid control valve in FIG. 2.

Figure 2:
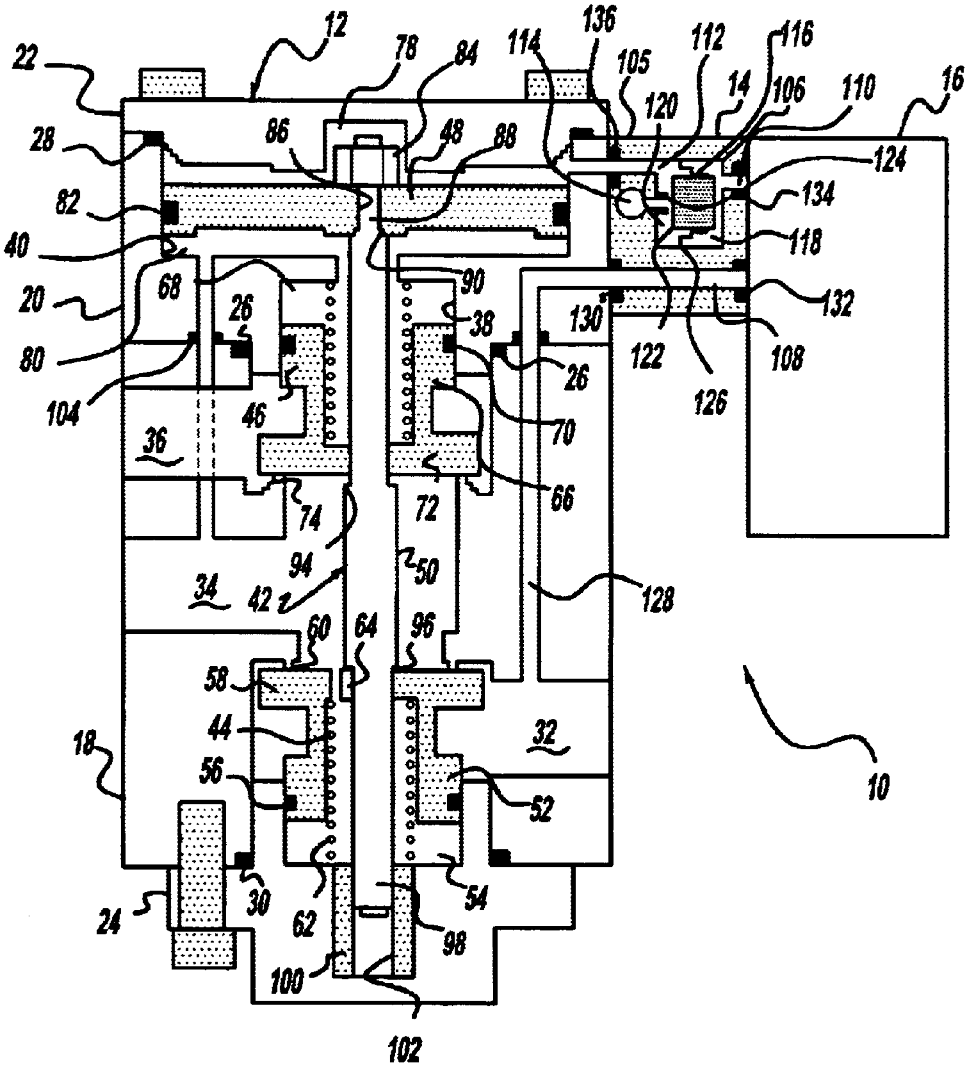
FIG. 2 is a cross-sectional view of the variable pressure control device in an unpressurized and deactuated position.

Referring in particular to FIG. 2, variable pressure control device 10 comprises a main valve assembly 12, a quick exhaust valve 14, and a proportional regulator 16. Main valve assembly 12 includes a main body portion 18, a secondary body portion 20, an upper end cap 22, and a lower end cap 24. Main body portion 18 is positioned adjacent to and in contact with secondary body portion 20. A seal 26 is disposed between main body portion 18 and secondary body portion 20 to seal the interface therebetween. Upper end cap 22 is positioned adjacent to and in contact with secondary body portion 20. A seal 28 is disposed between upper end cap 22 and secondary body portion 20 to seal the interface therebetween. Lower end cap 24 is positioned adjacent to and in contact with main body portion 18. A seal 30 is disposed between lower end cap 24 and main body portion 18. Main body portion 18, secondary body portion 20, upper end cap 22, and lower end cap 24 are coupled together via conventional fasteners.

Main valve assembly 12 further includes a fluid inlet passage 32, a fluid outlet passage 34, fluid exhaust passage 36, a valve bore 38, and a piston bore 40. Disposed within valve bore 38 and piston bore 40 is a valve member 42. Valve member 42 comprises a lower poppet member 44, an upper poppet member 46, a piston 48, and a valve stem 50. Lower poppet member 44 includes a base portion 52 slidably disposed within a chamber 54 of valve bore 38. A seal 56 is disposed between base portion 52 and lower end cap 24 which seals chamber 54 from fluid inlet passage 32. Lower poppet member 44 further includes a face portion 58 that selectively engages a seat 60 formed in main body portion 18 of main valve assembly 12.

Lower poppet member 44 is normally biased via a spring 62 into a seated position where face portion 58 of lower poppet member 44 contacts seat 60 of main valve assembly 12 to prevent fluid flow between fluid inlet passage 32 and fluid outlet passage 34. As will be described below, lower poppet member 44 is further positionable to an unseated position where face portion 58 of lower poppet member 44 is spaced apart from seat 60 of main valve assembly 12 to enable fluid flow between fluid inlet passage 32 and fluid outlet passage 34. Lower poppet member 44 still further includes a fluid passage 64 formed through face portion 58 to enable fluid to flow between chamber 54 and fluid outlet passage 34. Fluid passage 64 equalizes the fluid pressure between chamber 54 and fluid outlet passage 34.

Similarly, upper poppet member 46 includes a base portion 66 slidably disposed within a chamber 68 of valve bore 38. A seal 70 is disposed between base portion 66 and secondary body portion 20 which seals chamber 68 from fluid exhaust passage 36. Upper poppet member 46 further includes a face portion 72 that selectively engages a seat 74 formed in main body portion 18 of main valve assembly 12. It should be noted that upper poppet member 46 and lower poppet member 44 are preferably of identical construction to simplify construction and assembly.

Upper poppet member 46 is normally biased via a spring 76 into a seated position where face portion 72 of upper poppet member 46 contacts seat 74 of main valve assembly 12 to prevent fluid flow between fluid outlet passage 34 and fluid exhaust passage 36. As will be described below, upper poppet member 46 is further positionable into an unseated position where face portion 72 of upper poppet member 46 is spaced apart from seat 74 of main valve assembly 12 to enable fluid flow between fluid outlet passage 34 and fluid exhaust passage 36.

Piston 48 is slidably disposed within piston bore 40, thereby defining an upper piston chamber 78 and a lower piston chamber 80. A seal 82 is disposed between piston 48 and piston bore 40 which seals upper piston chamber 78 from lower piston chamber 80. Piston 48 is fixedly mounted to valve stem 50 for movement therewith via fastener 84. More particularly, piston 48 includes an aperture 86 formed therethrough that is sized to receive an upper end 88 of valve stem 50. Piston 48 is then captured between a first shoulder 90 on valve stem 50 adjacent upper end 88 and fastener 84. A fluid passage 92, surrounding valve stem 50, extends between lower piston chamber 80 and chamber 68.

Valve stem 50 further includes a second shoulder 94 and a third shoulder 96. Second shoulder 94 is sized to engage face portion 72 of upper poppet member 46 in order to selectively move upper poppet member 46 upward against the biasing force of spring 76 in response to upward movement of piston 48. Similarly, third shoulder 96 is sized to engage face portion 58 of lower poppet member 44 in order to selectively move lower poppet member 44 downward against the biasing force of spring 62 in response to downward movement of piston 48. A lower end 98 is slidably disposed within a sleeve 100. Sleeve 100 is positioned within a guide bore 102.

A fluid passage 103 extends between fluid outlet passage 34 and lower piston chamber 80. Fluid passage 103 includes a seal 104 disposed along fluid passage 103 between main body portion 18 and secondary body portion 20 to seal the interface therebetween.

Still referring to FIG. 2, quick exhaust valve 14 of variable pressure control device 10 includes a body 105, a valve bore 106, a flow-through passage 108, an inlet pilot passage 110, an outlet pilot passage 112, and an exhaust passage 114. A quick exhaust poppet member 116 is slidably disposed within valve bore 106 of quick exhaust valve 14, thereby defining an inlet chamber 118 and an outlet chamber 120. Inlet chamber 118 is fluidly coupled with an outlet of proportional regulator 16. Outlet chamber 120 is fluidly coupled with upper piston chamber 78 via outlet pilot passage 112. Quick exhaust poppet member 116 includes a face portion 122 that selectively engages a seat 124 formed on an end of exhaust passage 114 in response to a pressure differential between outlet chamber 120 and inlet chamber 118. Quick exhaust poppet member 116 is positionable in a seated position so as to contact seat 124 of exhaust passage 114 to prevent fluid flow between upper piston chamber 78 and exhaust passage 114. Quick exhaust poppet member 116 is further positionable in an unseated position wherein face portion 122 of quick exhaust poppet member 116 is spaced apart from seat 124 of exhaust passage 114 to enable venting of fluid within upper piston chamber 78. Quick exhaust poppet member 116 further includes a bypass leg 126 extending around the periphery of quick exhaust poppet member 116 that is normally biased to engage the wall of valve bore 106. Bypass leg 126 permits fluid flow thereby in response to a predetermined fluid pressure differential between inlet pilot passage 110 and outlet pilot passage 112. Quick exhaust valve 14 is mounted to secondary body portion 20 of main valve assembly 12.

Proportional regulator 16 is mounted to quick exhaust valve 14 in fluid communication with main valve assembly 12 for controlling the output and/or exhaust of main valve assembly 12. Specifically, a fluid passage 128 extends between fluid inlet passage 32 of main valve assembly 12 to flow-through passage 108 of quick exhaust valve 14. In turn, flow-through passage 108 of quick exhaust valve 14 is fluidly coupled to an inlet of proportional regulator 16, thereby providing an input fluid source for operation of proportional regulator 16. A seal 130 and a seal 132 are disposed between flow-through passage 108 and secondary body portion 20 of main valve assembly 12 and proportional regulator 16, respectively, to seal the interface therebetween. Similarly, a seal 134 is disposed between inlet pilot passage 110 and an outlet of proportional regulator 16. Likewise, a seal 136 is disposed between outlet pilot passage 112 and secondary body portion 20 of main valve assembly 12 to seal the interfaces therebetween.

As best seen in FIG. 1, proportional regulator 16 generally includes a variable pressure valve 138 that is adjustable by an operator to control a pilot pressure output through a proportional pilot valve 140. A pressure transducer 142 supplies fluid pressure information to variable pressure valve 140.

Operation

FIGS. 1 and 2 illustrate variable pressure control device 10 in its deactuated or neutral position with no fluid pressure supplied to fluid inlet passage 32. In this position, spring 62 biases lower poppet member 44 upward such that face portion 58 of lower poppet member 44 is seated against seat 60 of main body portion 18, thereby closing communication between fluid inlet passage 32 and fluid outlet passage 34. Similarly, spring 76 biases upper poppet member 46 downward such that face portion 72 of upper poppet member 46 is seated against seat 74 of main body portion 18, thereby closing communication between fluid outlet passage 34 and fluid exhaust passage 36. Piston 48 is in a neutral position as a result of the generally equal fluid pressure within upper piston chamber 78 and lower piston chamber 80. Accordingly, valve stem 50 is positioned such that neither second shoulder 94 nor third shoulder 96 exert an unseating force against upper poppet member 46 or lower poppet member 44, respectively. Likewise, due to the generally equal fluid pressure within output pilot passage 112 and inlet pilot passage 110, quick exhaust poppet member 116 is in an unseated position relative to seat 124 of exhaust passage 114. In this unseated position, fluid within upper piston chamber 78 and output pilot passage 112 is permitted to vent through exhaust passage 114. Accordingly, upper piston chamber 78, lower piston chamber 80, fluid outlet passage 34, fluid inlet passage 32, and fluid exhaust passage are each generally at ambient pressure.

Figure 3:
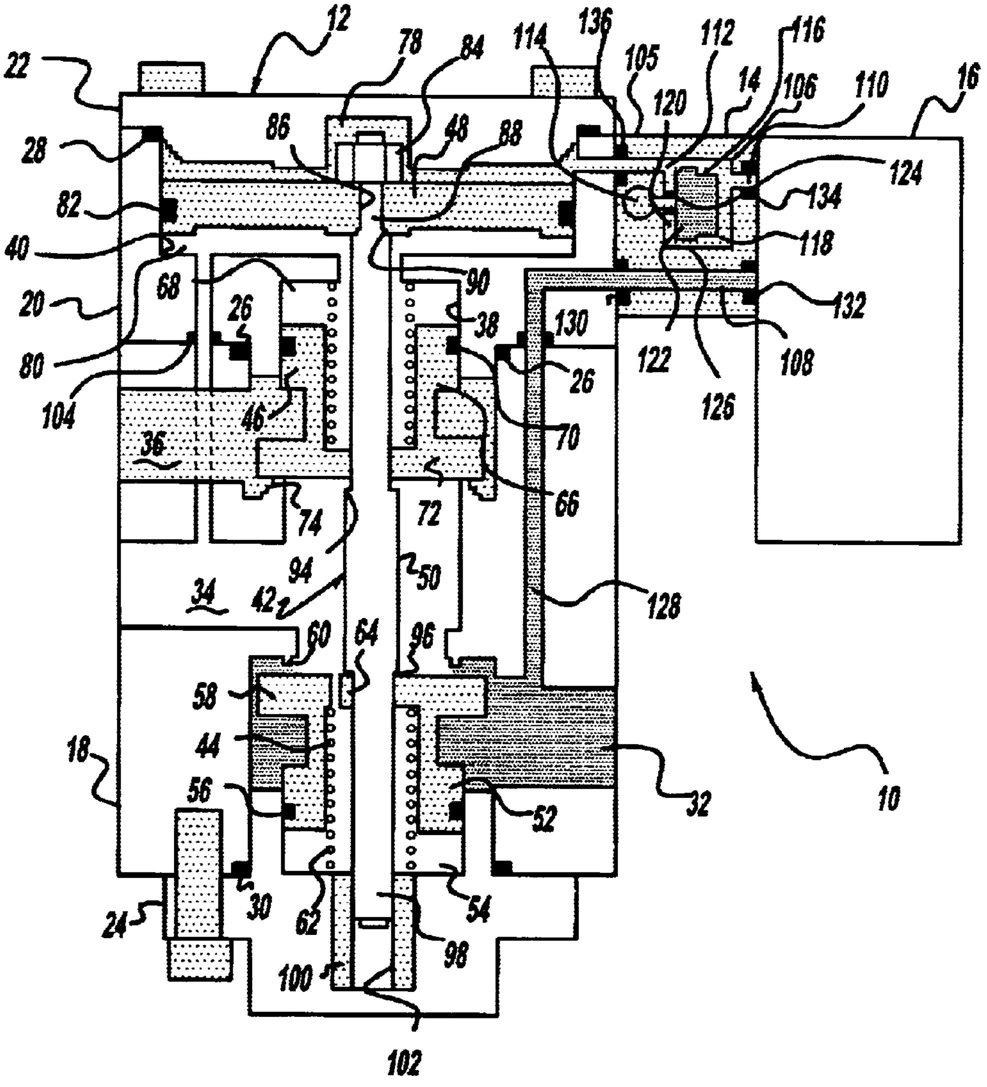
FIG. 3 is a cross-sectional view of the variable pressure control device in a first pressurized position with a lower poppet member in an unseated position.

FIG. 3 illustrates the first introduction of fluid pressure within variable pressure control device 10. Specifically, fluid pressure is introduced into fluid inlet passage 32, fluid passage 128, flow-through passage 108, and into the inlet of proportional regulator 16. Proportional regulator 16 outputs an output pilot pressure or regulator pressure in accordance with control signal applied to proportional pilot 140. This outlet pilot pressure from proportional regulator 16 is introduced into inlet pilot passage 110 and, thus, acts upon a backside of quick exhaust poppet member 116. This pilot pressure causes face portion 122 of quick exhaust poppet member 116 to seat against seat 124 of exhaust passage 114, thereby closing communication between upper piston chamber 78 and exhaust passage 114. Simultaneously, bypass leg 126 of quick exhaust poppet member 116 folds to enable fluid flow from inlet pilot passage 110 to outlet pilot passage 112 and upper piston chamber 78. With reference to FIG. 1, quick exhaust valve 14 would be positioned as shown such that fluid flows through the uppermost portion of valve 14.

Figure 4:
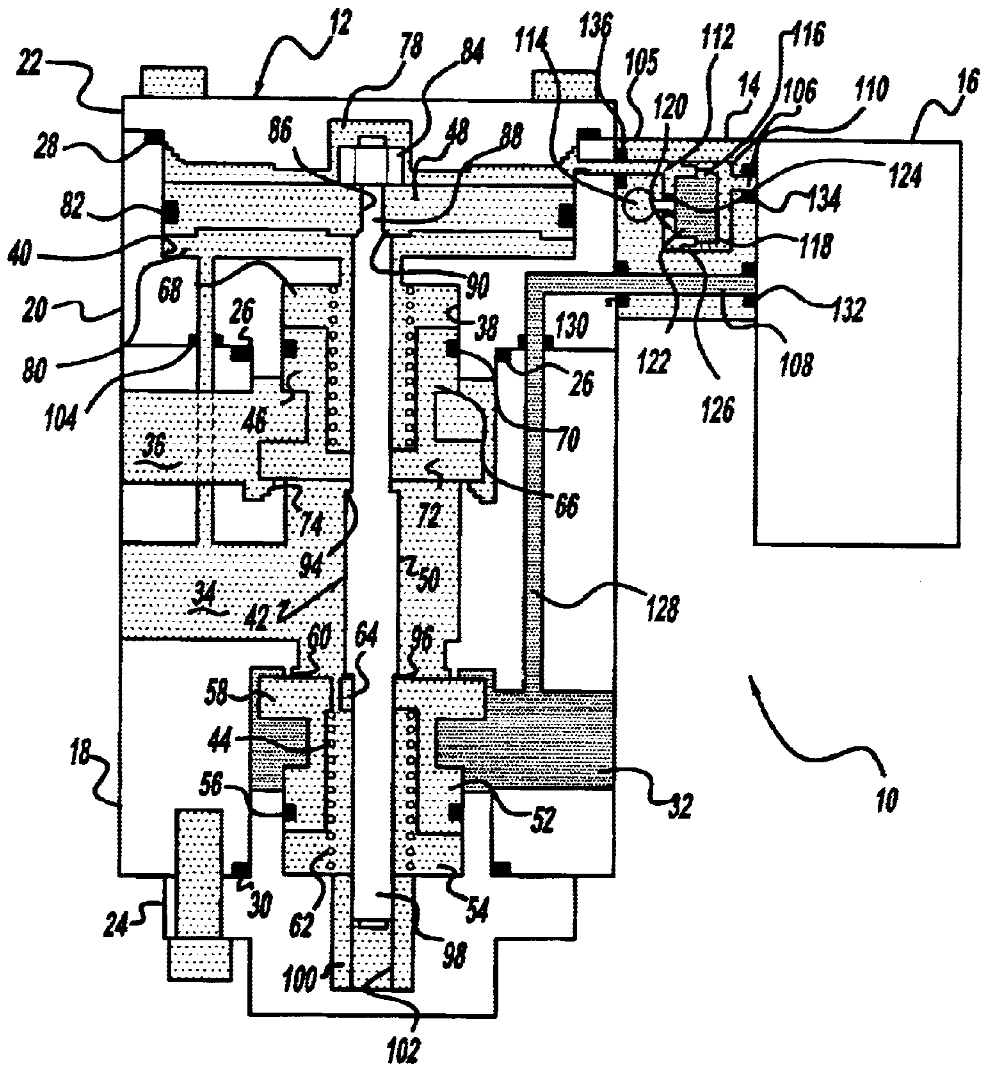
FIG. 4 is a cross-sectional view of the variable pressure control device in the pressurized position.

Fluid pressure within upper piston chamber 78 is greater than the fluid pressure within lower piston chamber 80, thereby exerting a downward force upon piston 48. This downward force on piston 48 causes piston 48 and valve stem 50 to translate downward. As seen in FIG. 3, downward movement of valve stem 50 causes third shoulder 96 to engage face portion 58 of lower poppet member 44, thereby unseating lower poppet member 44 from seat 60 and permitting fluid flow from fluid inlet passage 32 to fluid outlet passage 34. This position would be the right most position of valve 12 illustrated in FIG. 1. As seen in FIG. 4, fluid flow from fluid inlet passage 32 to fluid outlet passage 34 will continue until the force from the fluid pressure within fluid outlet passage 34, fluid passage 103, and lower piston chamber 80 and spring force of spring 62 generally equals the fluid pressure in upper piston chamber 78, thereby causing piston 48 and valve stem 50 to return to a neutral position and lower poppet member 44 to reseat on seat 60 due to the force of spring 62.

Figure 5:
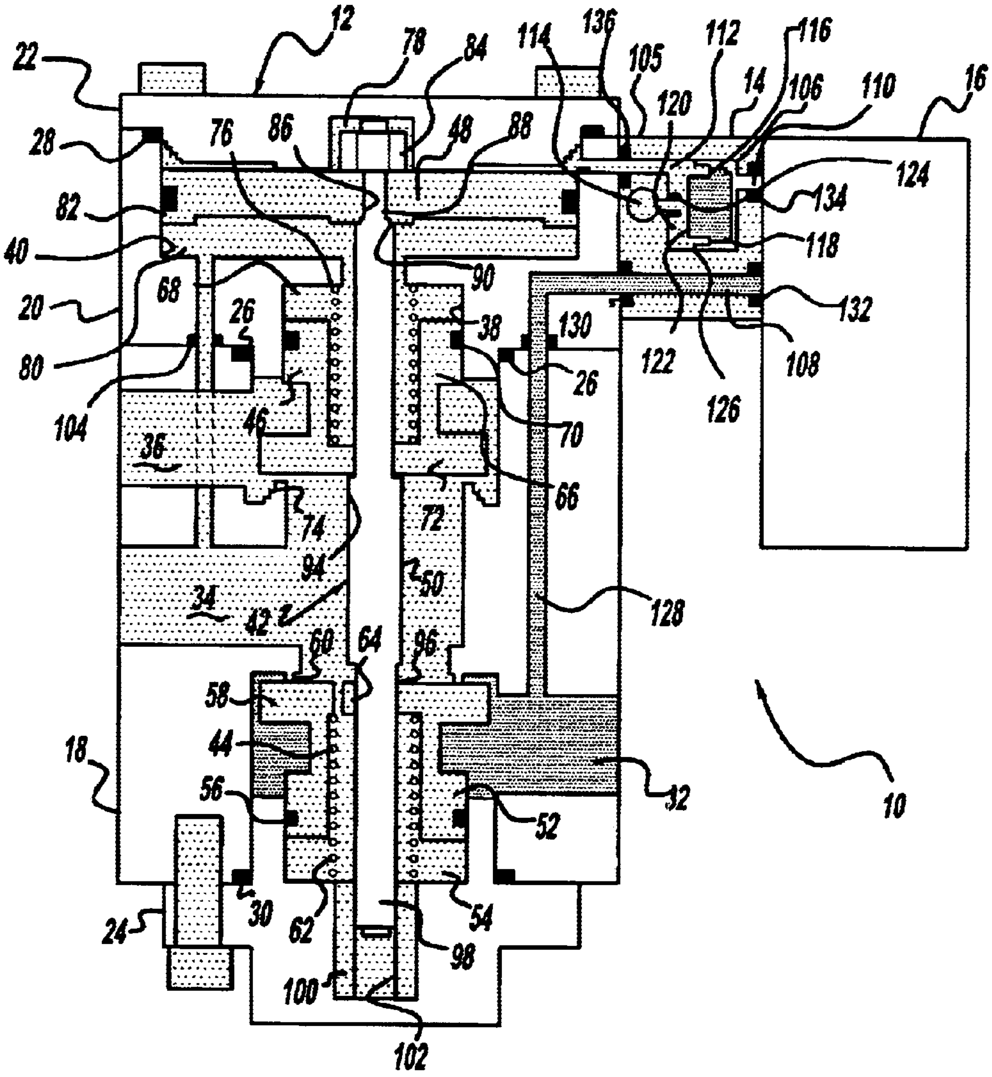
FIG. 5 is a cross-sectional view of the variable pressure control device in the pressurized position with an upper poppet member in an unseated position.
Figure 6:
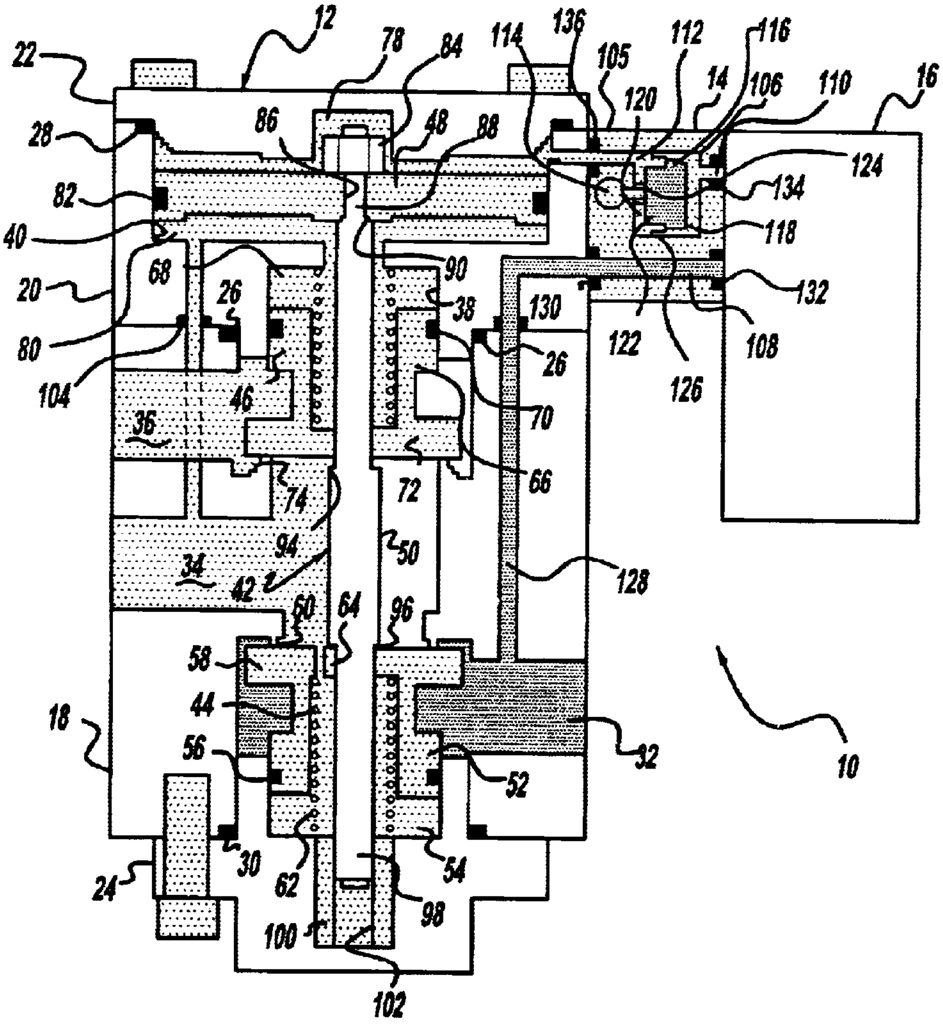
FIG. 6 is a cross-sectional view of the variable pressure control device in a pressurized and deactuated position.

FIG. 5 illustrates the quick exhausting of main valve assembly 12. Specifically, in this mode the outlet pressure of proportional regulator 16 is reduced such that the fluid pressure at inlet pilot passage 110 is less than the fluid pressure in upper piston chamber 78 of main valve assembly 12. This pressure differential causes quick exhaust poppet member 116 to slide within valve bore 106 and unseat from seat 124 of exhaust passage 114. The unseating of quick exhaust poppet member 116 from exhaust passage 114 enables fluid pressure within upper piston chamber 78 and outlet pilot passage 112 to vent through exhaust passage 114, thereby reducing the fluid pressure within upper piston chamber 78 and outlet pilot passage 112 to the pressure in the outlet of pilot passage 110, which is effectively equal to atmosphere. Relative to FIG. 1, fluid would vent through the lowermost portion of quick exhaust valve 14. As the fluid pressure within upper piston chamber 78 decreases, the pressure differential between lower piston chamber 80 and upper piston chamber 78 exerts an upward force upon piston 48. This upward force on piston 48 causes piston 48 and valve stem 50 to translate upward. As seen in FIG. 5, upward movement of valve stem 50 causes second shoulder 94 to engage face portion 72 of upper poppet member 46, thereby unseating upper poppet member 46 from seat 74 and permitting the quick exhaust of fluid from fluid outlet passage 34 to fluid exhaust passage 36. That is, valve 12 would be translated to its leftmost position (FIG. 1). As seen in FIG. 6, fluid flow from fluid outlet passage 34 to fluid exhaust passage 36 will continue until the force from the fluid pressure within fluid outlet passage 34, fluid passage 103, and lower piston chamber 80 and the spring force from spring 76 generally equal the fluid pressure in upper piston chamber 78 (which is effectively equal to ambient), thereby causing piston 48 and valve stem 50 to return to a neutral position and upper poppet member 46 to reseat on seat 74 by the force of spring 76.

Variable pressure control device 10 of the present invention possesses the ability to rapidly respond to a pilot pressure and, consequently, rapidly change the output fluid pressure to a higher or lower pressure in response to a pilot pressure signal while providing fluid flow to a cylinder or device. Variable pressure control device 10 of the present invention can start at any fluid pressure in its range, including zero pressure, and rapidly adjust to any other pressure within its range. It is unique in its ability to change its pressure higher or lower quickly while simultaneously providing fluid flow.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve system comprising:

a housing defining an inlet, an outlet, and an exhaust;

a first passage extending between said inlet and said outlet;

a second passage extending between said outlet and said exhaust;

a first valve disposed within said first passage, said first valve being movable between a closed position and an opened position;

a second valve disposed within said second passage, said second valve being movable between a closed position and an opened position;

a regulator circuit operably coupled to said housing, said regulator circuit outputting a pilot pressure in response to a control signal; and an actuating member disposed within said housing, said actuating member slidably moveable in response to a pressure differential between said outlet and said pilot pressure, said actuating member independently actuating said first valve and said second valve.

2. The control valve system according to claim 1 wherein said actuating member comprises:

a piston member slidably disposed within said housing, said piston member moveable in response to said pressure differential between said outlet and said pilot pressure into a first position, a second position, and a third position, said piston member urging said first valve into said opened position when said piston member is in said first position, said piston member urging said second valve into said opened position when said piston member is in said second position.

3. The control valve system according to claim 2 wherein said regulator circuit comprises:

an adjustable proportional regulator fluidly coupled to said inlet, said proportional regulator outputting said pilot pressure in response to a pressure of said inlet; and a quick exhaust valve member disposed between said adjustable proportional regulator and said piston member, said quick exhaust valve member being operable to selectively vent said pilot pressure.

4. The control valve system according to claim 1 wherein each of said first valve and second valve comprises a poppet member and a biasing member, said biasing member biasing said poppet member in said closed position.

5. The control valve system according to claim 2 wherein said piston member comprises:

a piston plate slidably disposed within said housing; and a valve stem fixedly coupled to said piston plate and moveable therewith, said valve stem having a first shoulder portion engageable with said first valve for urging said first valve into said opened position, said valve stem having a second shoulder portion engageable with said second valve for urging said second valve into said opened position.

6. A circuit for operating a control valve system comprising:

an inlet, an outlet, and an exhaust;

a first passage extending between said inlet and said outlet;

a second passage extending between said outlet and said exhaust;

a first valve disposed within said first passage, said first valve being movable between a closed position and an opened position;

a second valve disposed within said second passage, said second valve being movable between a closed position and an opened position;

a regulator circuit operably outputting a pilot pressure in response to a control signal; and an actuating member slidably moveable in response to a pressure differential between said outlet and said pilot pressure, said actuating member independently actuating said first valve and said second valve.

7. The circuit according to claim 6 wherein said actuating member comprises:

a piston member slidably moveable in response to said pressure differential between said outlet and said pilot pressure into a first position, a second position, and a third position, said piston member urging said first valve into said opened position when said piston member is in said first position, said piston member urging said second valve into said opened position when said piston member is in said second position, said first valve and said second valve in said closed positions when said piston member is in said third position.

8. The circuit according to claim 6 wherein said regulator circuit comprises:

an adjustable proportional regulator fluidly coupled to said inlet, said proportional regulator outputting said pilot pressure in response to a control signal; and a quick exhaust valve member disposed between said adjustable proportional regulator and said piston member, said quick exhaust valve member being operable to selectively vent said pilot pressure.

9. The circuit according to claim 6 wherein each of said first valve and second valve comprises a poppet member and a biasing member, said biasing member biasing said poppet member in said closed position.

10. The circuit according to claim 7 wherein said piston member comprises:

a piston plate; and a valve stem fixedly coupled to said piston plate and moveable therewith, said valve stem having a first shoulder portion engageable with said first valve for urging said first valve into said opened position, said valve stem having a second shoulder portion engageable with said second valve for urging said second valve into said opened position.

11. A control valve system comprising:

a housing defining an inlet, an outlet, and an exhaust;

a first passage extending between said inlet and said outlet;

a second passage extending between said outlet and said exhaust;

a first valve disposed within said first passage, said first valve being movable between a closed position and an opened position;

a second valve disposed within said second passage, said second valve being movable between a closed position and an opened position;

an adjustable proportional regulator fluidly coupled to said inlet, said proportional regulator outputting said pilot pressure in response to a control signal;

a quick exhaust valve member disposed between said adjustable proportional regulator and said piston member, said quick exhaust valve member being operable to selectively vent said pilot pressure; and a piston member slidably disposed within said housing, said piston member moveable in response to a pressure differential between said outlet and said pilot pressure into a first position and a second position, said piston member urging said first valve into said opened position when said piston member is in said first position, said piston member urging said second valve into said opened position when said piston member is in said second position.

12. The control valve system according to claim 11 wherein each of said first valve and second valve comprises a poppet member and a biasing member, said biasing member biasing said poppet member in said closed position.

13. The control valve system according to claim 11 wherein said piston member comprises:

a piston plate slidably disposed within said housing; and a valve stem fixedly coupled to said piston plate and moveable therewith, said valve stem having a first shoulder portion engageable with said first valve for urging said first valve into said opened position, said valve stem having a second shoulder portion engageable with said second valve for urging said second valve into said opened position.

14. A circuit for operating a control valve system comprising:

an inlet, an outlet, and an exhaust;

a pressure regulator operably outputting a regulator pressure in response to a control signal;

a valve member interconnecting said inlet, said outlet, and said exhaust, said valve member being positionable in response to a pilot pressure in a first position where said inlet, said outlet, and said exhaust are each closed, a second position where said inlet is in fluid communication with said outlet, and a third position where said outlet is in fluid communication with said exhaust; and a quick exhaust valve fluidly coupled between said pressure regulator and said valve member, said quick exhaust valve positionable in a supply position to provide said pilot pressure to said valve member in response to said regulator pressure from said pressure regulator and a vent position where said pilot pressure is vented, wherein said quick exhaust valve is positioned into said vent position when said pilot pressure is generally greater than said regulator pressure.

15. The circuit according to claim 14, further comprising:

a pair of opposing members normally biasing said valve member in said first position.

* * * * *